Figure 1:
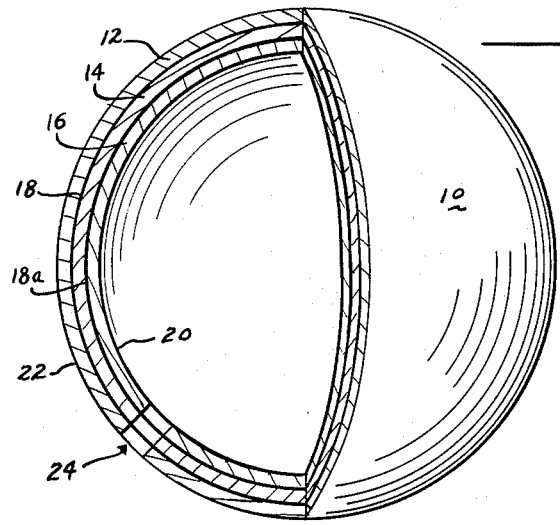

Sept. 21, 1965     T. J. REINHART, JR     3,207,352

LAMINATED PRESSURE VESSELS

Filed Dec. 4, 1962

- PROTECTIVE COATING (OPTIONAL)
- FILAMENT WOUND SHELL
- ELASTOMERIC COATING
- FILAMENT WOUND SHELL
- ELASTOMERIC COATING
- FILAMENT WOUND SHELL
- METALLIC INNER LINER

INVENTOR.
THEODORE J. REINHART, JR.
BY Harry A. Herbert Jr.
Louis E. Hay
ATTORNEYS 3,207,352
LAMINATED PRESSURE VESSELS
Theodore J. Reinhart, Jr., 4116 Woodedge Drive,
Bellbrook, Ohio
Filed Dec. 4, 1962, Ser. No. 242,335
4 Claims. (Cl. 220—3)

The invention described herein may be manufactured and used by or for the Government for governmental purposes without the payment to me of any royalty thereon.

This invention relates generally to pressure vessels and, more specifically, to laminated pressure vessels under extremely high pressure. Futhermore, pressure vessels in accordance with this invention may be either so-called closed vessels or open vessels such as rocket motor cases.

It has been well established that when the wall thickness of a pressure vessel approaches 10% of its radius, the thin wall pressure vessel formulas and membrane theory are no longer applicable. Thick-wall theory must be applied in the design of such vessels and structures.

It is well known that when a thick wall pressure vessel is internally pressurized, a stress gradient is set up in the wall. The induced tensile stresses are a maximum at the inside radius and diminish toward the outside radius. Likewise, when such a pressure vessel is subjected to external pressure, the compressive stresses progressively increase from the outer to the inner radius of the vessel.

In the conventional thick-wall homogeneous or laminated vessels, this stress gradient has been ignored and the vessels designed to limit the maximum stress to that which the inner layer of material may withstand. This, by necessity, results in a relatively inefficient use of material and a heavy vessel. Not only are needlessly heavy pressure vessels more expensive to fabricate, but in many applications such as found on airplanes and space craft, such excess weight is extremely detrimental.

This invention provides a simple and effective solution to the thick-wall, stress gradient problem. Pressure vessels made in accordance with this invention consist of filament or tape wound contiguous or laminated shells, being of so-called "thin layer" construction, each shell from the inner to the outer being formed of a material having a greater modulus of elasticity than the preceding shell. The actual dimensional design of the pressure vessel may be by trial and error or in accordance with formulas developed for various shaped vessels.

When a pressure vessel made in accordance with this invention is pressurized, the greater stiffness of the outer layer causes it to absorb stress at a greater rate than its immediately adjacent inner shell. Furthermore, the greater stiffness of the outer layers tend to restrict the stress absorption of the inner layers. The inter-shell interaction, being in direct opposition to the stress gradient of a thick wall structure, tends to counteract or negate the stress gradient in the conventional thick wall vessel.

When a pressure vessel made in accordance with this invention is subjected to external pressure, as when used at depths in the ocean, the interaction between shells would, in like manner, serve to level out the compressive stress gradient induced in the wall of the vessel.

A vessel made in accordance with this invention, by the proper selection of materials and shell thickness, may be made to have a wall having a substantially uniform stress level throughout. Such a vessel may be made with the minimum amount of material working at maximum efficiency.

The primary object of this invention is to provide a pressure vessel in which all the material comprising the walls is substantially stressed.

Another object of this invention is to provide a laminated pressure vessel corresponding to a conventional thick-wall vessel and in which each shell is carrying a proportionate part of the stress resulting from the pressure acting on the vessel.

A further object of this invention is to provide a laminated pressure vessel in which the various shells may be made of materials each having a different modulus of elasticity in order to secure better stress distribution within the walls of the vessel.

Yet another object of this invention is to provide the lightest possible high pressure vessel, by efficiently utilizing the materials comprising the vessel.

A still further object of this invention is to provide a high strength, lightweight pressure vessel having a plurality of laminated or contiguous shells which are seamless and in which the materials comprising the walls are substantially and more or less uniformly stressed from either internal or external pressure.

Figure 2:
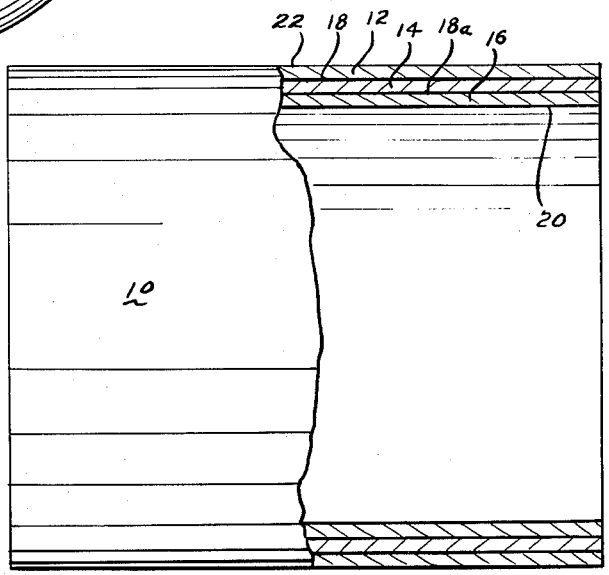
Figure 3:
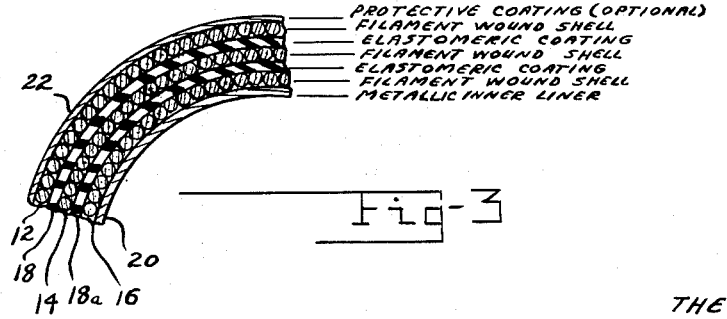

Additional objects, advantages and features of the invention reside in the construction, arrangement and combination of parts involved in the embodiments of the invention as will appear from the following description and accompanying drawings, wherein:

FIG. 1 shows a spherical vessel in partial section as representative of a closed pressure vessel made in accordance with this invention, FIG. 2 shows in partial section an open end vessel such as used on rocket motors, as representative of open end pressure vessels made in accordance with the invention, and FIG. 3 is an enlarged fragmentary sectional view showing the wall construction details of the spherical vessel of FIG. 1; the construction details being equally applicable to the vessel shown on FIG. 2.

Referring to FIG. 1, which is representative of closed vessel structures, the pressure vessel referred to generally as vessel 10 is shown as having three contiguous shells: the outer shell 12, the intermediate shell 14 and the inner shell 16. Although three shells are shown, any number of shells greater than one may be used within the scope of the invention. Each shell may be made of any suitable material in the form of filaments or tapes and wound in a manner well known to the art. Suitable bonding materials may be used during construction, and the vessel so formed may be cured as dictated; the bonding and curing processes being well known to the art and not constituting part of this invention.

If desired, a strain-absorbing elastomeric coating 18 and 18a may be applied between shells. Such coating may be made of butyl rubber, for example. Such coating has little compressibility and serves to absorb strain differentials between the shells.

In many applications, depending upon the gases to be contained within the vessel, and permeability of the vessel, the vessel so formed will be completely satisfactory. In other applications, it may be desirable or even necessary to use an inner liner 20 which may be metallic or of low permeable non-metallic material. If desired, the completed vessel may be coated with a moisture barrier or protective coating 22.

The vessel is provided with suitable connective openings such as opening 24. Such openings, which are usually threaded or flanged, are not claimed as part of this invention and may be built into the vessel in manners well known to the art.

The tabulation below, which in no way limits the materials which may be used in the construction of vessels in accordance with this invention, is intended to show how materials for the various shells may be selected based upon a graduated modulus of elasticity. Likewise, there is no limitation stating that all shells should be constructed from materials in the same group. For example, a vessel could readily be made having one shell of glass filaments, one of metal filaments and one of organic filaments.

Glass filaments

| Designation: | Elastic modulus, p.s.i. |
|---|---|
| E glass | $10.5 \times 10^6$ |
| 994 glass | $12.5 \times 10^6$ |
| YM31A glass | $16.0 \times 10^6$ |

Metal filaments

| | Elastic modulus, p.s.i. |
|---|---|
| Titanium | $17 \times 10^6$ |
| Steel | $30 \times 10^6$ |
| Molybdenum | $50 \times 10^6$ |

Organic filaments

| | Elastic modulus, grams/denier |
|---|---|
| Nylon | 60 |
| Dacron | 80 |
| Fortisan | 100 |
| Ht-1 | 140 |

A second embodiment of the invention is shown on FIG. 2 which is representative of open pressure vessels such as used for example on a missile motor case. The vessel depicted by FIG. 2 may be made in accordance with the method used in making the closed pressure vessel previously described. Accordingly, like elements on both figures are designated by like numerals.

Pressure vessels in accordance with this invention may be made by winding onto a suitable mandrel. With vessels which do not use a metallic inner liner, such a mandrel may be cast or otherwise formed of low melting temperature metals or alloys, as for example Woods metal. After the vessel is completed, the metal is melted and poured from the vessel through one of the openings.

With vessels using a metallic inner liner, the mandrel may be formed by filling the liner with a liquid low melting temperature metal or alloy which is then allowed to solidify. After the vessel is formed, the metal is again liquefied and poured from the vessel.

It is to be understood that the embodiments of the present invention as shown and described are to be regarded as illustrative only and that the invention is susceptible to variations, modifications and changes within the scope of the appended claims.

I claim:
1. A laminated pressure vessel comprising: at least three contiguous shells, each shell being of continuous filament wound multilayer construction from a continuous filament supply and each shell from the inside out being of a filament having a higher modulus of elasticity than the filament forming the preceding shell.

2. A laminated pressure vessel comprising: at least three contiguous shells and a metallic inner liner having its outer surface joined to the inside surface of the innermost shell, each shell being of continuous filament wound multilayer construction from a continuous filament supply and each shell from the inside out being of a filament having a higher modulus of elasticity than the filament forming the preceding shell.

3. A laminated pressure vessel comprising: at least three contiguous shells and an elastomeric stress distributing coating between each shell, each shell being of continuous filament wound multilayer construction from a continuous filament supply and each shell from the inside out being of a filament having a higher modulus of elasticity than the filament forming the preceding shell.

4. A laminated pressure vessel comprising: at least three contiguous shells, an elastomeric stress distributing coating between each shell, and a metallic inner liner having its outer surface joined to the inside surface of the innermost shell, each shell being of continuous filament wound multilayer construction from a continuous filament supply and each shell from the inside out being of a filament having a higher modulus of elasticity than the filament forming the preceding shell.

References Cited by the Examiner

UNITED STATES PATENTS

| 2,652,943 | 9/53 | Williams | 220—3 |
| 2,744,043 | 5/56 | Ramberg | 156—155 |
| 2,786,007 | 3/57 | Chew | 156—155 |
| 2,809,762 | 10/57 | Cardona | 220—63 |
| 2,988,240 | 6/61 | Hardesty | 220—3 |
| 3,023,495 | 3/62 | Noland | 220—3 |
| 3,031,099 | 4/62 | Wiltshire | 220—3 |
| 3,047,191 | 7/62 | Young | 220—3 |

THERON E. CONDON, *Primary Examiner.*

EARLE J. DRUMMOND, *Examiner.*